UNITED STATES PATENT OFFICE.

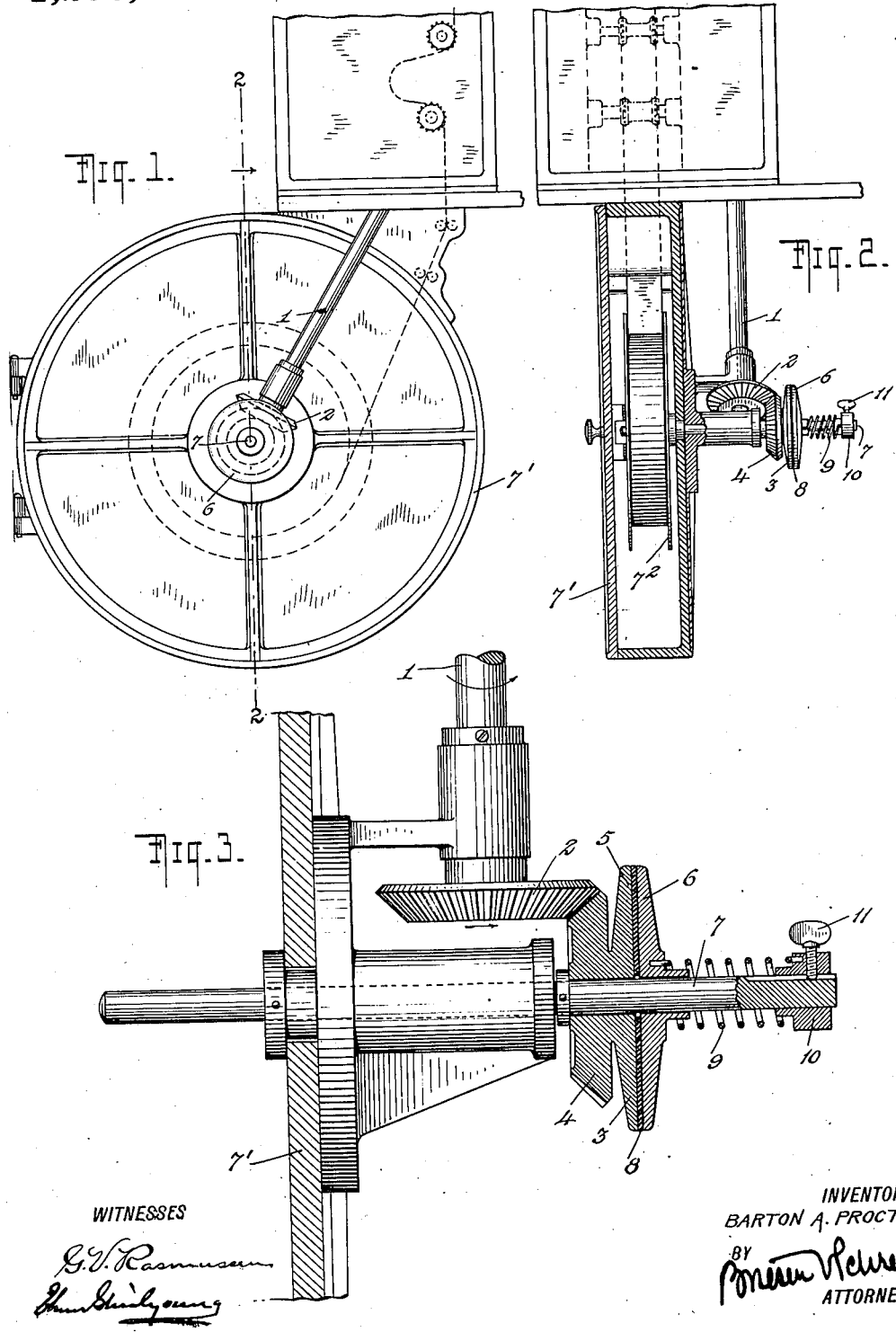

BARTON A. PROCTOR, OF BRIDGETON, NEW JERSEY, ASSIGNOR TO KINOIKON APPARATUS CORPORATION, OF BRIDGETON, NEW JERSEY, A CORPORATION OF DELAWARE.

AUTOMATIC COMPENSATED TAKE-UP REEL.

1,298,395.   Specification of Letters Patent.   Patented Mar. 25, 1919.

Application filed June 21, 1917. Serial No. 176,055.

*To all whom it may concern:*

Be it known that I, BARTON A. PROCTOR, a citizen of the United States, residing at Bridgeton, Cumberland county, State of New Jersey, have invented certain new and useful Improvements in Automatically - Compensated Take-Up Reels for Moving Pictures, of which the following is a specification.

My invention relates to moving picture machines of the type employing a continuous length or strip of film having consecutively arranged pictures thereupon, and has to do particularly with mechanism for winding up the film after it has been passed through the machine.

My invention relates especially to that usual type of moving picture machine in which the film is continuously wound upon a spool or reel after it has been exposed.

In machines of the referred to type, the take-up reel is ordinarily, and almost necessarily, driven from a shaft which rotates at a speed which is definite and constant for a definite and constant speed of the sprocket wheels which pass the film through the display mechanism proper. Inasmuch as it is necessary that the film, as it passes to the take-up reel, should be taut in order that it may wind tightly upon the reel, and since the diameter of the take-up reel is necessarily constantly increasing as the film is wound thereupon, it is necessary and usual to "overdrive" the reel but to leave a certain amount of slip between it and its driving shaft.

It is desirable, of course, that as the diameter of the take-up reel increases, the tension in the film as it winds thereupon should remain constant; if this were not so and the tension should decrease, then an obstruction in the slot at the bottom of the film display mechanism just above the take-up reel, might completely stop the reel when near its maximum diameter, although the driving power acting upon the reel would be sufficient to overcome the obstruction when the diameter of the reel was small. To accomplish this, the pressure between the two slipping parts should increase with the increase of diameter.

In my invention, about to be described, the parts are so arranged that, as the diameter of the take-up reel increases, a spring which controls the pressure between the driving member and the related friction or slip member connected to the take-up reel will automatically straighten out so as to increase said pressure with the increase in diameter of the take-up reel and thereby maintain a constant tension in the film.

My invention will be better understood by referring to the accompanying drawings in which Figure 1 represents a side elevation of the take-up reel as attached to the housing of a moving picture machine and embodying my invention; Fig. 2 is a section, part elevation, taken along the line 2—2 of Fig. 1, looking in the direction of the arrow; and Fig. 3 is an enlarged detail, part section and part elevation, showing the take-up reel and its drive and my invention embodied therewith.

In the drawings, 1 represents a driving member which is operatively connected with the film display mechanism (not shown) and rotates at a speed having a definite and constant relation to the speed of said display mechanism. Fixed to this driving member is a beveled gear 2, which drives a friction member 3 comprising another beveled gear 4 having a friction disk 5 integrally attached thereto. Opposed to friction disk 5 is a similar friction or pressure disk 6, and both member 3 and disk 6 are loosely mounted upon shaft 7 upon an extension of which, in a suitable housing 7', is mounted the take-up reel 7². Disks 5 and 6 are separated by a disk of felt or the like 8.

A spring 9 has its one end fixed in pressure disk 6 and its other end fixed in a sleeve 10, itself fixed to shaft 7 by set screw 11 which engages a linear slot thereof. Spring 9 is under a certain amount of axial compression, which compression may be varied by sliding the sleeve 10, axially in one direction or the other, upon the shaft before tightening the set screw.

In the operation of the machine, let the shaft 1 be assumed to be rotating in the direction indicated by the arrow thereupon and at constant speed, as should be the case if the film display mechanism is properly controlled. Shaft 7, with attached take-up reel, would thereby also tend to be rotated at constant speed through gear 4, disks 5, 6, and spring 9, if permitted to do so. And this would be the case even if the parts are so dimensioned and determined that shaft 7 is "overdriven", *i. e.*, is driven at a speed which would wind the film upon the reel faster than the sprocket wheels will deliver the film to the reel. Hence, when the film is in place, and being wound, there will be a certain slip between the friction disks 5 and 6, due to the drag of the film upon the reel as the body of film thereupon increases in diameter, and the spring 9 will tend to unwind (the spring having been originally wound in such a direction as to insure this result) thus increasing the pressure between the two disks. Hence the shaft 7 is retarded and compelled to rotate proportionately more and more slowly as the reel diameter increases thereby correspondingly unwinding the spring 9 and increasing the pressure between the disks, 5, 6. The pull exerted upon the film by the reel, i. e., the tension with which the film is stretched between the sprocket wheels and the reel, will therefore remain a constant for all diameters of the reel.

Variations of detail may, of course, be made within the spirit of the invention and the scope of the following claims:

1. In a moving picture machine, a take-up reel, rotary drive means therefor, and a power transmitting connection between reel and drive means, said connection comprising frictional elements and a helical spring which also maintains said elements in contact, said spring, considering its power receiving end as its origin, being wound in the same direction as that in which the drive means is required to rotate so that slowing of the reel with respect to the drive means will cause the spring to unwind and thus increase the pressure between the frictional elements.

2. In a moving picture machine, a driving shaft, a second shaft provided with a take-up reel, a pair of friction disks loosely mounted upon said second shaft one of which is connected directly to the driving shaft, and a helical spring mounted upon said second shaft connected between the remaining disk and said second shaft, the spring, considering its power receiving end as its origin, being wound in the same direction as that in which the driving friction disk is required to rotate so that the slowing of the reel with respect to the drive means will cause the spring to unwind and thus increase the pressure between the two disks.

3. In a moving picture machine, a driving shaft, a second shaft provided with a take-up reel, a pair of friction disks loosely mounted upon said second shaft, one of which is connected directly to the driving shaft, and a helical spring mounted upon said second shaft connected between the remaining disk and said second shaft upon which this latter spring end is linearly adjustable, the spring, considering its power receiving end as its origin, being wound in the same direction as that in which the driving friction disk is required to rotate so that the slowing of the reel with respect to the drive means will cause the spring to unwind and thus increase the pressure between the two disks.

In testimony whereof I have hereunto set my hand.

BARTON A. PROCTOR.